US006005489A

United States Patent [19]

Siegle et al.

[11] Patent Number: 6,005,489

[45] Date of Patent: Dec. 21, 1999

[54] ELECTRIC POWER TOOL WITH CODE RECEIVER

[75] Inventors: Volker Siegle, Winnenden, Germany; Gunnar Christer Hansson, Stockholm, Sweden

[73] Assignee: Atlas Copco Tools AB, Nacka, Sweden

[21] Appl. No.: 08/633,765

[22] PCT Filed: Aug. 17, 1995

[86] PCT No.: PCT/SE95/00932

§ 371 Date: Jul. 1, 1996

§ 102(e) Date: Jul. 1, 1996

[87] PCT Pub. No.: WO96/06479

PCT Pub. Date: Feb. 29, 1996

[30] Foreign Application Priority Data

Aug. 18, 1994 [DE] Germany ............................ 44 29 206

[51] Int. Cl.$^{6}$ ............................ H02J 13/00; G08C 17/00

[52] U.S. Cl. ............................ 340/825.69; 340/825.31; 340/572; 340/572.4; 340/636; 310/50; 320/114; 429/96

[58] Field of Search ........................ 340/825.69, 825.72, 340/825.31, 825.34, 572, 573, 310.01, 310.08, 636, 572.1, 572.4, 572.8, 572.9; 359/142, 144, 145, 147; 439/500; 307/66; 310/50; 320/114; 429/9, 99, 96; 1/1

[56] References Cited

U.S. PATENT DOCUMENTS

| | | | |
|---|---|---|---|
| 4,032,806 | 6/1977 | Seely | 310/50 |
| 4,347,450 | 8/1982 | Colligan | 310/50 |
| 4,751,452 | 6/1988 | Kilmer et al. | 310/50 X |
| 4,835,410 | 5/1989 | Bhagwat et al. | 307/66 X |
| 5,021,779 | 6/1991 | Bisak | 340/825.69 |
| 5,354,215 | 10/1994 | Viracola | 439/500 |

FOREIGN PATENT DOCUMENTS

| | | |
|---|---|---|
| 42 40 596 A1 | 6/1994 | Germany . |
| 43 00 600 A1 | 7/1994 | Germany . |
| 43 01 436 A1 | 7/1994 | Germany . |
| 2 229 025 | 9/1990 | United Kingdom . |
| 93/14550 | 7/1993 | WIPO . |

*Primary Examiner*—Brian Zimmerman
*Assistant Examiner*—William H. Wilson, Jr.
*Attorney, Agent, or Firm*—Frishauf, Holtz, Goodman, Langer & Chick, P.C.

[57] ABSTRACT

An electric power tool includes a power supply which is one of a replaceable battery unit, a rechargeable battery unit, and a cable connection for detachably connecting to a mains power supply. A code receiver is provided for receiving a code signal from a code signal emitting device via a contact free transmission. An electronic controller is arranged to switch the power tool to an operable mode when the power supply is coupled to the power tool and the code signal is received by the code signal receiver. The electronic controller is also arranged to switch the power tool to an inoperable mode when the power supply is uncoupled from the power tool and to maintain the power tool in the inoperable mode until the power supply is re-coupled to the power tool and the code signal is again received by the code signal receiver.

12 Claims, 3 Drawing Sheets

ELECTRIC POWER TOOL WITH CODE RECEIVER

BACKGROUND OF THE INVENTION

The invention relates to a hand-held electric power tool which comprises a device for alternatively disabling and enabling operation of the tool.

Electric power tools, for example rechargeable battery powered or mains-connected screwdrivers, are frequently used in, for example industrial assembly. Since these types of power tools are portable, they are occasionally removed from the workplace without permission and are never returned. This represents a costly loss for the owner.

OBJECT OF THE INVENTION

The object of the invention is to ensure, in the case of a portable power tool, that the tool can only be used in an authorised workplace.

SUMMARY OF THE INVENTION

According to the invention, the above object is achieved in that the power tool comprises a receiver and an electronic control means which is arranged to receive a code signal, wherein the electronic control means switches the tool on to an operable mode upon receiving the code signal, and wherein upon disconnection from the electrical supply voltage or after a certain time or operation interval, the tool returns to an inoperable mode and remains therein until the code signal is again received.

A code signal transmitter is permanently installed in the vicinity of the authorized workplace.

By virtue of this device, upon disconnection from the supply voltage, i.e. by removing the accumulator in a rechargeable battery powered tool or disconnecting the mains plug in a mains-operated tool, or after a certain time or operation interval, the tool is switched into the inoperable mode and remains therein. If the tool is removed from the authorized workplace, in the case of a rechargeable battery powered tool, it can only be used until the charge runs out; in the case of a mains-operated tool, it can no longer be operated at all; in the case of time-interval or operation-interval switching, the tool can no longer be operated after such interval has expired. This gives the owner great protection against theft, because relevant personnel will know that the tool is only usable at the workplace in connection with the code signal transmitter.

The tool according to the present invention will only be switched to the operable mode when the tool receives the code signal after reconnection of a battery unit in the case of a rechargeable tool, or reconnection to the mains or after expiry of the time or operation interval.

By means of different codings, groups of machines can be allocated to one of a number of working areas or code signal transmitters. Thus, the respective tools can only be used in the allotted working area. For example, in this manner it is possible to allocate screwdrivers having a specified torque setting to an assembly line (working area) at which such working operations only are to be carried out which require that particular torque setting. It is thereby ensured that in this working area, work is always carried out at the correct torque setting. Due to the specific coding in this working area, screwdrivers which are set to a different torque or in which the output torque is not determined cannot be used, because these tools do not switch into the operable mode in such working area.

It is also possible to allocate other technical criteria to the coding. Furthermore, the coding can also be carried out according to administrative conditions; for example, the coding may be designed in such a manner that tools belonging to one cost center are only switched into the operable mode by a code signal within the working area of such cost center.

Various advantages embodiments of the invention will be obvious in view of the following description of a preferred embodiment of the invention.

DETAILED DESCRIPTION

Figure 1:
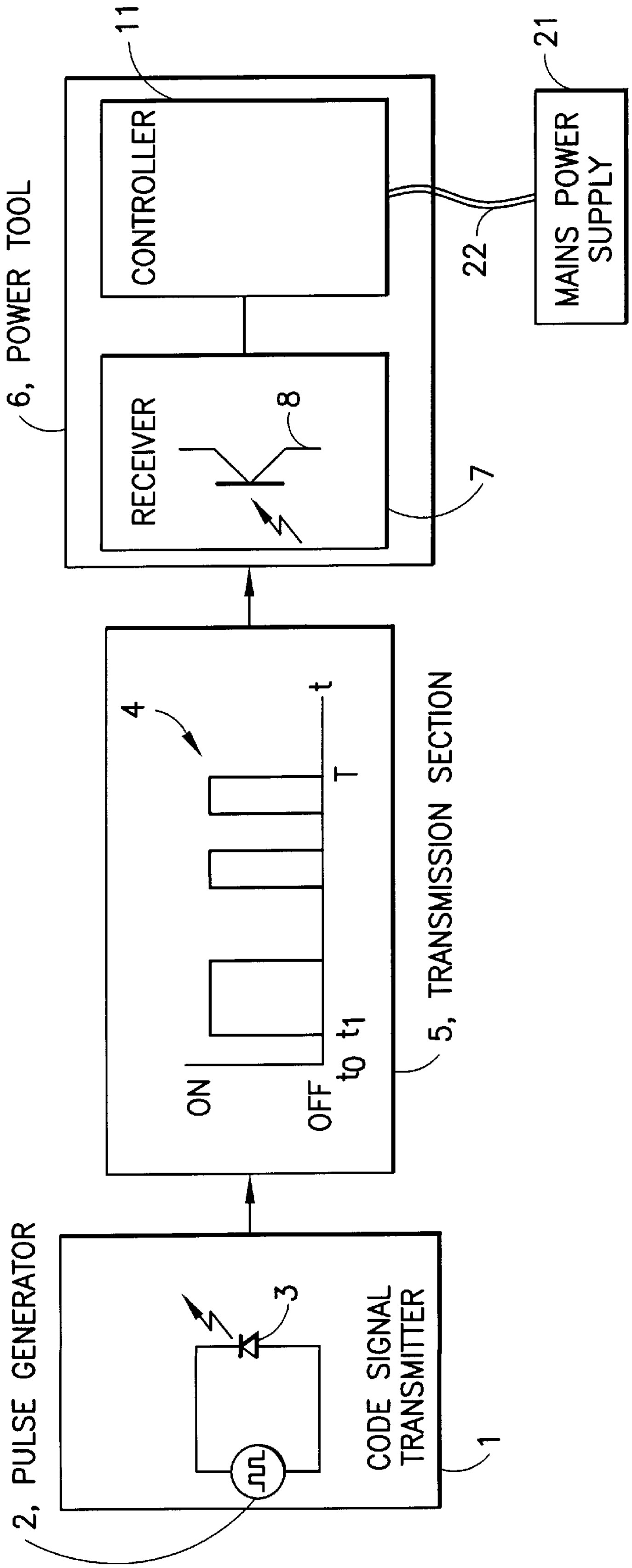
FIG. 1 shows a code signal transmitter having a transmission section and a hand-held power tool being in the vicinity thereof.

A code signal transmitter 1 is installed in a stationary manner in for instance a factory. The code signal transmitter 1 has a pulse generator 2 and an infrared transmitting diode 3. The code signal transmitter 1 periodically transits a digital code signal 4 via a transmission section 5. In the example, the code signal begins at t0:01100101 and ends at T. t1 is the duration of one of the ones or zeros. The code signal 4 can also be coded in another way.

At least one power tool 6 is allocated to the code signal transmitter 1. This tool has a receiver 7 comprising an infrared transistor 8, which receives the code signal 4 when the power tool 6 is brought into the vicinity of the code signal transmitter 1.

Instead of the infrared transmission section 5, a radio transmission section can also be provided. It Is also possible to provide a plug-in cable connection as a transmission section between the code signal transmitter 1 and the power tool 6.

Figure 2:
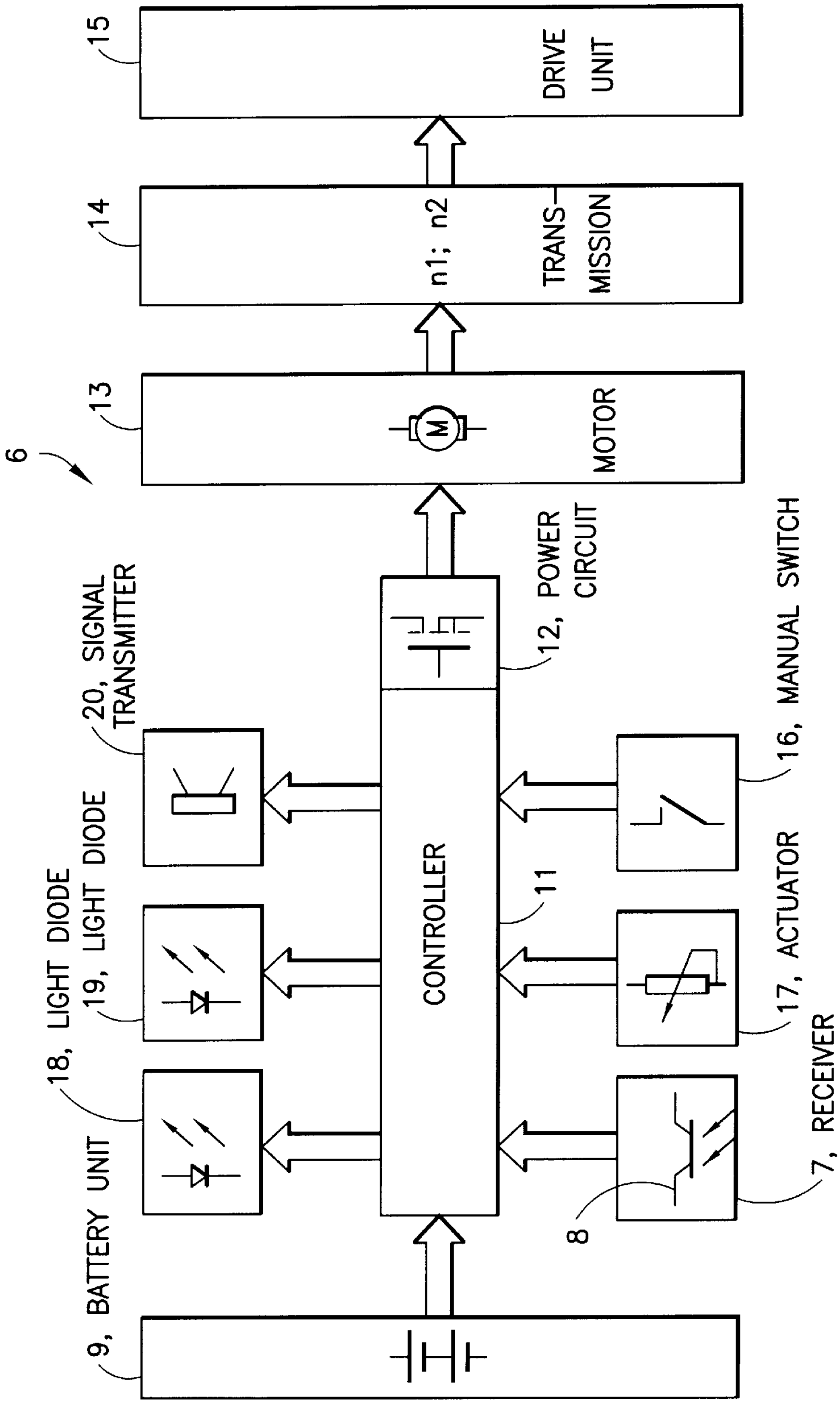
FIG. 2 shows a block circuit diagram of the power tool.

In the embodiment illustrated in FIG. 2, the power tool 6 is equipped with an exchangeable battery unit 9. A charging device needed for the battery unit 9 may be advantageously integral with the code signal transmitter 1. This makes the association between the code signal transmitter 1, the charging device and the associated power tool 6 easy to monitor and simplifies the operational coupling thereof as described above.

The receiver 7 is connected to an electronic controller (control means) 11 incorporated in the tool 6. The electronic control means 11 operates with a microprocessor, which is allocated a power circuit 12, by which the exchangeable battery unit 9 is connectable to a D.C. motor 13 of the tool 6. A mechanical transmission 14 is connected between the D.C. motor 13 and a drive unit 15 for the screwdriver bit, drill or other tool (not shown) (cf. FIG.2).

To the electronic control means 11 there is connected a manual switch 16, by which the motor 13 can be switched on or off via the power circuit 12 by the operator. Furthermore, the tool comprises an actuator 17, which acts on the electronic control means 11 and with which a further operational parameter can be set. For example, in the case of a screwdriver, the torque can be adjusted.

The electronic control means 11 also controls two light diodes 18, 19, which indicate the operable mode or the inoperable mode of the tool 6. The light diodes 18, 19 can also indicate other operating States, for example the state of charge of the battery unit 9 and whether a screw joint has been tightened correctly or not. An acoustic signal transmitter 20 can be provided to signal faulty tightening processes.

As an additional feature of the code signal transmission system, data concerning desired operation characteristics like torque output, angle of rotation etc. may be transferred to the power tool together with the tool operation enabling code signal. Also, a code signal emitting means may be fitted to the power tool for sending back to a stationary signal receiver the actual operation data obtained during a certain interval of operation. These data may be stored, and an analysis of the performed operations may be carried out later on.

The modus operandi of the device will now be described with reference to FIG. 3.

A replacement of the battery unit 9 of the tool 6 by a recharged unit, represents a reset command and a start command (a) for the microprocessor of the electronic control means 1. Upon the start command (a), initialization of variable parameters takes place, which is indicated by the block (b). Thereafter, a probe cycle is started in which the infrared transistor is probed. If a signal is received, a bit is set to 1. If no signal is received, the bit is set to 0. This bit is then put into the first position in the receiving byte. After the time interval (t1), the cycle is repeated and the bit value is transferred to the next position in the receiving byte. After each cycle, the receiving byte is compared with the code word stored. If these correspond, the tool is switched to its operable mode. If, accordingly, the receiving byte corresponds to the code signal 01100101, then the block (g) switches to the operable mode, as shown by block (h). The tool 6 is then capable of being switched on and off by means of the manual switch 16. During the probe cycle, however, the tool cannot be switched on and off by means of the manual switch 16.

Having been switched to its operable mode via its electronic control means 11, the tool 6 may also be moved outside the range of the code signal transmitter 1. The probe cycle shown in FIG. 3 is then no longer carried out, but is initialized only when the battery unit 9 is exchanged or, in the case of a mains-operated tool connected to a mains power supply 21 via a cable connection 22 (as shown in FIG. 1), when the mains plug is pulled out and plugged in again.

If in the block (g) it is established that the receiving byte does not correspond to the code—01100101 in the example—then processing returns to block (c). The above-mentioned processes are repeated until the correct receiving byte is received.

Figure 3:
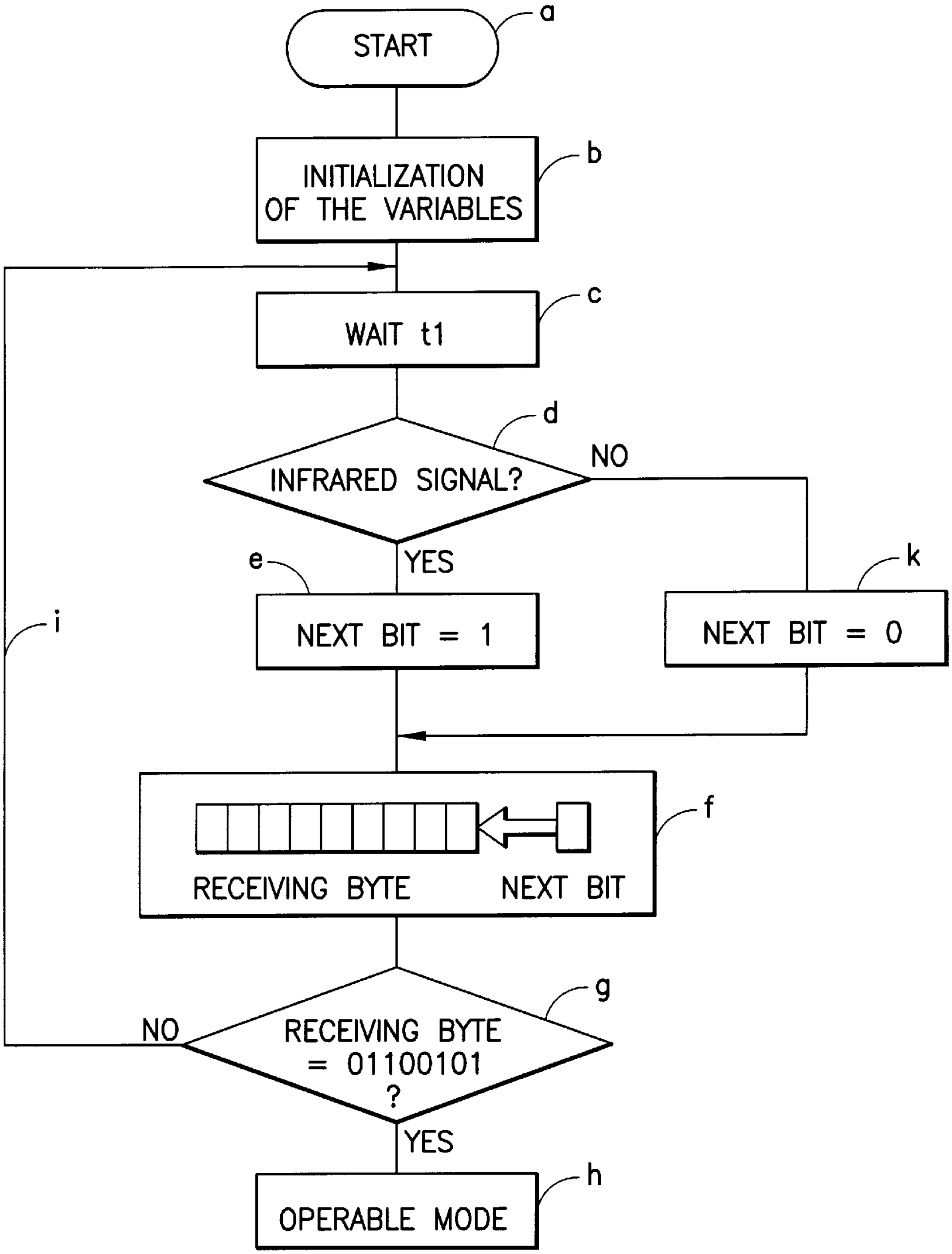
FIG. 3 shows a flow chart of the electronic control means of the power tool

After the operable mode (h) is obtained, the probe cycle of FIG. 3 is no longer carried out.

The alternative embodiments of the invention are not limited to the above described example but may be freely varied within the scope of the claims.

Accordingly, the infrared code signal transmission may be replaced by an inductive or a conductive electrical connection between the power tool itself and a code signal emitting device. This may be carried out by docking temporarily the power tool with the signal emitting device, thereby bringing an electric contact means on the power tool into a direct contact with a mating contact means on the signal emitting device.

Alternatively, the code signal receiver 7 and the control means 11 may be integrated with the replaceable battery unit 9, and the code signal emitting device may be integrated with the charging device for the battery unit 9.

A further security feature for preventing unauthorized use of the power tool is to have the code signal emitting device activated by a second code signal transferred via the mains power supply connected to the code signal emitting device Still another way of limiting the use of the power tool is to give the code signal certain operator definable characteristics.

What is claimed is:

1. A device for disabling and enabling operation of a portable electric power tool, said electric power tool including a replaceable battery unit and a rechargeable battery unit, said device comprising:

a code signal receiver for receiving a code signal from a code signal emitting device via a contact free transmission; and an electronic controller arranged to switch the power tool to an operable mode only when both a charged battery unit is fitted to the power tool and the code signal is received by said code signal receiver, and to maintain the power tool in the operable mode so long as the battery unit remains fitted to the power tool without requiring the code signal to be received again by said code signal receiver; and the electronic controller being arranged to switch the power tool to an inoperable mode when the battery unit is removed from the power tool and to maintain the power tool in the inoperable mode until both a new charged battery unit is fitted to the power tool and the code signal is again received by said code signal receiver.

2. The device according to claim 1, wherein said electronic controller continuously repeats a probe cycle when the tool is in the inoperable mode whereby said code signal receiver is continuously probed to determine whether or not the code signal has been received each time a new charged battery unit is fitted to the power tool.

3. The device according to claim 2, wherein said electronic controller discontinues said probe cycle after a predetermined time interval during which said code signal receiver does not receive the code signal, whereby said electronic controller maintains the power tool in the inoperable mode.

4. The device according to claim 1, wherein said code signal receiver comprises an optical receiver for receiving an optical code signal from the code signal emitting device.

5. The device according to claim 1, wherein said code signal receiver comprises an electromagnetic receiver for wireless receiving an electromagnetic code signal from the code signal emitting device.

6. The device according to claim 1, wherein the power tool has a manually operable ON-OFF switch, and wherein when the electronic controller maintains the power tool in the operable mode, the power tool is manually switchable between the ON and OFF conditions by an operator, so as to permit manual starting and stopping operation of the power tool without requiring the code signal to be received again by said code signal receiver.

7. A portable electric power tool comprising:

a replaceable battery unit for supplying power;

a code receiver for receiving a code signal from a code signal emitting device via a contact free transmission; and an electronic controller arranged to switch the power tool to an operable mode only when both a charged battery unit is fitted to the power tool and the code signal is received by said code signal receiver, and to maintain the power tool in the operable mode so long as the battery unit remains fitted to the power tool without requiring the code signal to be received again by said code signal receiver; and the electronic controller being arranged to switch the power tool to an inoperable mode when the battery unit is removed from the power tool and to maintain the power tool in the inoperable mode until both a new charged battery unit is fitted to the power tool and the code signal is again received by said code signal receiver.

8. The power tool according to claim 7, wherein said electronic controller continuously repeats a probe cycle when the tool is in the inoperable mode whereby said code signal receiver is continuously probed to determine whether or not the code signal has been received each time a new charged battery unit is fitted to the power tool.

9. The power tool according to claim 7, wherein said electronic controller discontinues said probe cycle after a predetermined time interval during which said code signal receiver does not receive the code signal, whereby said electronic controller maintains the power tool in the inoperable mode.

10. The power tool according to claim 7, wherein said code signal receiver comprises an optical receiver for receiving an optical code signal from the code signal emitting device.

11. The power tool according to claim 7, wherein said code signal receiver comprises an electromagnetic receiver for wireless receiving an electromagnetic code signal from the code signal emitting device.

12. The power tool according to claim 7, further comprising a manually operable ON-OFF switch, and wherein when the electronic controller maintains the power tool in the operable mode, the power tool is manually switchable between the ON and OFF conditions by an operator, so as to permit manual starting and stopping operation of the power tool without requiring the code signal to be received again by said code signal receiver.

* * * * *

UNITED STATES PATENT AND TRADEMARK OFFICE

CERTIFICATE OF CORRECTION

PATENT NO. : 6,005,489
DATED : December 21, 1999
INVENTOR(S) : Volker Siegle et al.

It is certified that error appears in the above-identified patent and that said Letters Patent is hereby corrected as shown below:

Title page,
Item [56] References Cited, under "U.S. PATENT DOCUMENTS" insert

| | | | |
|---|---|---|---|
| -- 4,791,409 | 12/1988 | Reid | 340/539 |
| 4,987,406 | 1/1991 | Reid | 340/539 --; |

Column 4,
Line 47, change "wireless" to -- wirelessly --;

Column 6,
Line 8, change "wireless" to -- wirelessly --.

Signed and Sealed this

Second Day of April, 2002

*Attest:*

JAMES E. ROGAN

*Attesting Officer*

*Director of the United States Patent and Trademark Office*